United States Patent [19]
Goebel

[11] Patent Number: 5,460,163
[45] Date of Patent: Oct. 24, 1995

[54] TROUGH-SHAPED COLLECTOR

[75] Inventor: Olaf Goebel, Stuttgart, Germany

[73] Assignee: Deutsche Forschungsanstalt fuer Luft- und Raumfahrt e.V., Bonn, Germany

[21] Appl. No.: 307,909

[22] Filed: Sep. 16, 1994

[30] Foreign Application Priority Data

Sep. 18, 1993 [DE] Germany .................. 43 31 784.7

[51] Int. Cl.⁶ .................................................. F24J 2/32
[52] U.S. Cl. .......................... 126/635; 126/652; 126/692; 165/104.26
[58] Field of Search .............................. 126/635, 692, 126/651, 652, 654, 655, 636, 637, 638, 684, 693; 165/104.26

[56] References Cited

U.S. PATENT DOCUMENTS

| | | | |
|---|---|---|---|
| 3,923,038 | 12/1975 | Cutchaw | 126/635 |
| 4,149,521 | 4/1979 | Fletcher | 126/692 |
| 4,153,039 | 5/1979 | Carroll. | |
| 4,214,572 | 7/1980 | Gonder. | |
| 4,217,882 | 8/1980 | Feldman, Jr. | 165/104.26 |
| 4,261,336 | 4/1981 | Uroshevich. | |
| 4,320,246 | 3/1982 | Russell | 126/636 |
| 4,619,243 | 10/1986 | Vironneau et al. . | |
| 4,909,316 | 3/1990 | Kamel et al. | 165/104.26 |

FOREIGN PATENT DOCUMENTS

3025826 1/1981 Germany .

*Primary Examiner*—James C. Yeung
*Attorney, Agent, or Firm*—Barry R. Lipsitz

[57] ABSTRACT

A trough-shaped collector for solar radiation for steam generation. A trough-shaped mirror extending in a longitudinal direction receives and reflects radiation onto an absorber line enclosing within its interior a steam generator tube in which water is heated, vaporized and superheated. Heat is transferred transversely from the absorber line to the steam generator tube by heat pipe segments spaced longitudinally along the absorber line.

12 Claims, 5 Drawing Sheets

Fig. 6

TROUGH-SHAPED COLLECTOR

BACKGROUND OF THE INVENTION

The invention relates to a trough-shaped collector for radiation, in particular for solar radiation, comprising a trough-shaped mirror extending in a longitudinal direction and reflecting the radiation into a focus region, and an absorber line extending in the longitudinal direction through the focus region of the trough-shaped mirror, a heat transport medium flowing through this absorber line for taking away the resulting heat.

Trough-shaped collectors of this type are known from the state of the art.

In these known trough-shaped collectors, the absorber line is preferably formed by a pipe which is heated unevenly in the circumferential direction by the radiation reflected from the trough-shaped mirror into the focus region and therefore has the tendency to deform. This means that the pipe bends out of the exact position in the focus region and so an optimal irradiation of the absorber line in the focus region is no longer ensured and the degree of efficiency of the trough-shaped collector diminishes appreciably, quite apart from mechanical problems with respect to the rigidity of the pipe which exist in addition.

The object underlying the invention is therefore to improve a trough-shaped collector of the known type such that the problems which exist due to the uneven irradiation of the absorber line are reduced or eliminated.

SUMMARY OF THE INVENTION

This object is accomplished in accordance with the invention, in a trough-shaped collector, in that the absorber line has an absorber screen extending transversely to the longitudinal direction and the absorber screen is thermally coupled to a guide tube for the heat transport medium via a heat pipe.

This means that the inventive concept decouples the guide tube from the absorber screen and so the absorber screen can be optimally positioned and dimensioned and, in addition, the absorber screen is coupled to the guide tube via the heat pipe in an optimum manner.

Therefore, the problems which exist due to the uneven irradiation of the absorber line in the focus region are eliminated to a great extent since the absorber screen and the guide tube are, on the one hand, mechanically decoupled and, on the other hand, an efficient heat transport between the two can be achieved via the heat pipe.

It is particularly advantageous for the heat pipe to be designed such that it heats the guide tube essentially uniformly in circumferential direction.

A solution is particularly expedient, in which a steam chamber of the heat pipe essentially surrounds the guide tube so that heat is introduced into the guide tube essentially uniformly in circumferential direction.

This can be realized particularly advantageously when the absorber screen is part of an absorber pipe surrounding the guide tube.

In this case, the guide tube is preferably arranged inside the absorber pipe so that the heat pipe coupling both the absorber screen and the guide tube can be arranged simply.

In addition, the heat pipe of a further, preferred embodiment is used to also keep the absorber pipe as a whole at an essentially constant temperature in the circumferential direction in order to prevent deformations due to an uneven distribution of temperature.

The heat pipe can, in principle, be a separate constructional element which is thermally coupled, on the one hand, to the absorber screen and, on the other hand, to the guide tube.

It is, however, particularly simple from a constructional point of view and especially with a view to the manufacturing costs for the absorber pipe and the guide tube to form housing elements of the heat pipe so that an additional separate housing is no longer required for the heat pipe and also the entire problems with the coupling of this housing both to the absorber pipe, i.e. in particular to the absorber screen thereof, and to the guide tube no longer exist.

A heat pipe is generally designed such that in it a heat transfer medium is vaporized on a vaporizer side experiencing a heat input and condensed on a condensate side making a heat discharge possible. The heat transfer medium in the condensed state is fed back to the vaporizer side, whereby a capillary structure is preferably provided, in addition, on the vaporizer side.

With such a heat pipe, a thermal coupling would, in principle, be possible both in the longitudinal direction as well as transversely to the longitudinal direction.

However, the inventive trough-shaped collector operates particularly advantageously when the heat pipe is designed such that it transports heat essentially transversely to the longitudinal direction from the absorber screen to the guide tube.

This can be realized in the simplest way from a constructional point of view when the heat pipe is formed by heat pipe segments following one another in the longitudinal direction so that a heat transport by means of vaporization and condensation is possible only within each heat pipe segment and, therefore, the thermal coupling in the longitudinal direction is limited by the extension of the heat pipe segment in the longitudinal direction.

From a constructional point of view, this can be realized in the simplest manner by means of inserts between the guide tube and the absorber pipe.

In this respect, an inventive, advantageous embodiment preferably provides for the heat pipe to have a capillary structure arranged on an inner side of the absorber screen.

This capillary structure is expediently saturated with the heat transfer medium so that this vaporizes out of the capillary structure during the heat input.

The heat transfer medium can, in principle, be any optional material provided it vaporizes and condenses at the temperatures occurring. For example, water, oil, mercury, cesium, sodium would be conceivable. Potassium is particularly preferred due to its favorable steam pressure at the temperatures attainable in accordance with the invention.

In a particularly expedient development of the inventive solution, the absorber screen has transversely to the longitudinal direction an extension corresponding approximately to the focal line width transversely to the longitudinal direction so that essentially all the radiation reaching the focus region is absorbed by the absorber screen.

With respect to the constructional optimization of an inventive trough-shaped collector, the provision of a heat pipe between the guide tube and the absorber screen offers the great advantage that in this case the aperture angle of the trough-shaped mirror can be reduced and, therefore, an extremely uneven irradiation of the absorber line accepted. This, in turn, creates the possibility of optimizing the actual, effective mirror surface with a view to the material required for the trough-shaped mirror since the heat pipe compensates for the extremely uneven irradiation of the absorber line.

In principle, the inventive embodiment could be designed such that the guide tube has, for example, an oil or another heat transport medium flowing through it which does not change its phase when heated.

However, the inventive trough-shaped collectors can be used particularly advantageously when the guide tube is a vaporizer tube and, therefore, the liquid heat transport medium can be vaporized with this tube and the phase changed.

Especially in the case of such a configuration, the inventive solution offers particularly great advantages since, despite a considerable extension of the focus region transversely to the longitudinal direction, the dimensions of the vaporizer tube, in particular its diameter, are independent of the dimensions of the focus region transversely to the longitudinal direction, and of the heat pipe provided, so that tubes having a considerably smaller diameter than the extension of the focus region transversely to the longitudinal region can be used as vaporizer tubes. This allows, on the one hand, a reduction in tube material and therefore leads to the possibility of designing the static construction to be lighter and simpler.

Moreover, it is also possible to use conventional, known heating pipes or tubes, for example from power stations, which for their part offer considerable cost advantages and known operating parameters.

Finally, a diameter of the vaporizer tube which is as small as possible has the advantage that the heat transfer from the vaporizer tube to the heat transport medium is more effective since the dimensions of the vaporizer tube can be optimized also in this respect.

An additional possibility of improving the thermal coupling between the vaporizer tube and the heat transport medium is for the vaporizer tube to have a structured inner wall, for example grooves extending helically which, on the one hand, increase the size of the inner surface of the vaporizer tube and, at the same time, cause the formation of a swirling effect in the vapor flow which, for its part, counteracts any formation of a vapor film in the vaporizer tube.

When using a vaporizer tube in an inventive absorber line, it is preferable for the vaporizer tube to have a preheating section, a phase transition section and a superheating section so that the heat transport medium, for example water, is first of all preheated, then vaporized and, finally, the resulting steam superheated.

In order to obtain, particularly, an increase in temperature which is essentially linear in the longitudinal direction and to suppress any heat transport through the heat pipe counteracting this over considerable dimensions in the longitudinal direction, it is preferable for the heat pipe to be divided into a plurality of heat pipe segments in the preheating section.

Moreover, the heat pipe is provided with a plurality of heat pipe segments in the superheating section for the same reasons.

A further, preferred embodiment of an inventive trough-shaped collector comprises a protective casing, which surrounds the absorber pipe and is transparent for the radiation, to suppress convection cooling.

The absorber pipe can, in principle, have any cross-sectional shape. In the case of a circular cross-sectional shape, the absorber pipe need not be turned with the trough-shaped mirror. In the case of, for example, a concave absorber surface, the absorber pipe has to be pivoted with the trough-shaped mirror.

Additional features and advantages of the invention are the subject matter of the following description as well as the drawings of several embodiments.

DETAILED DESCRIPTION OF THE INVENTION

Figure 1:
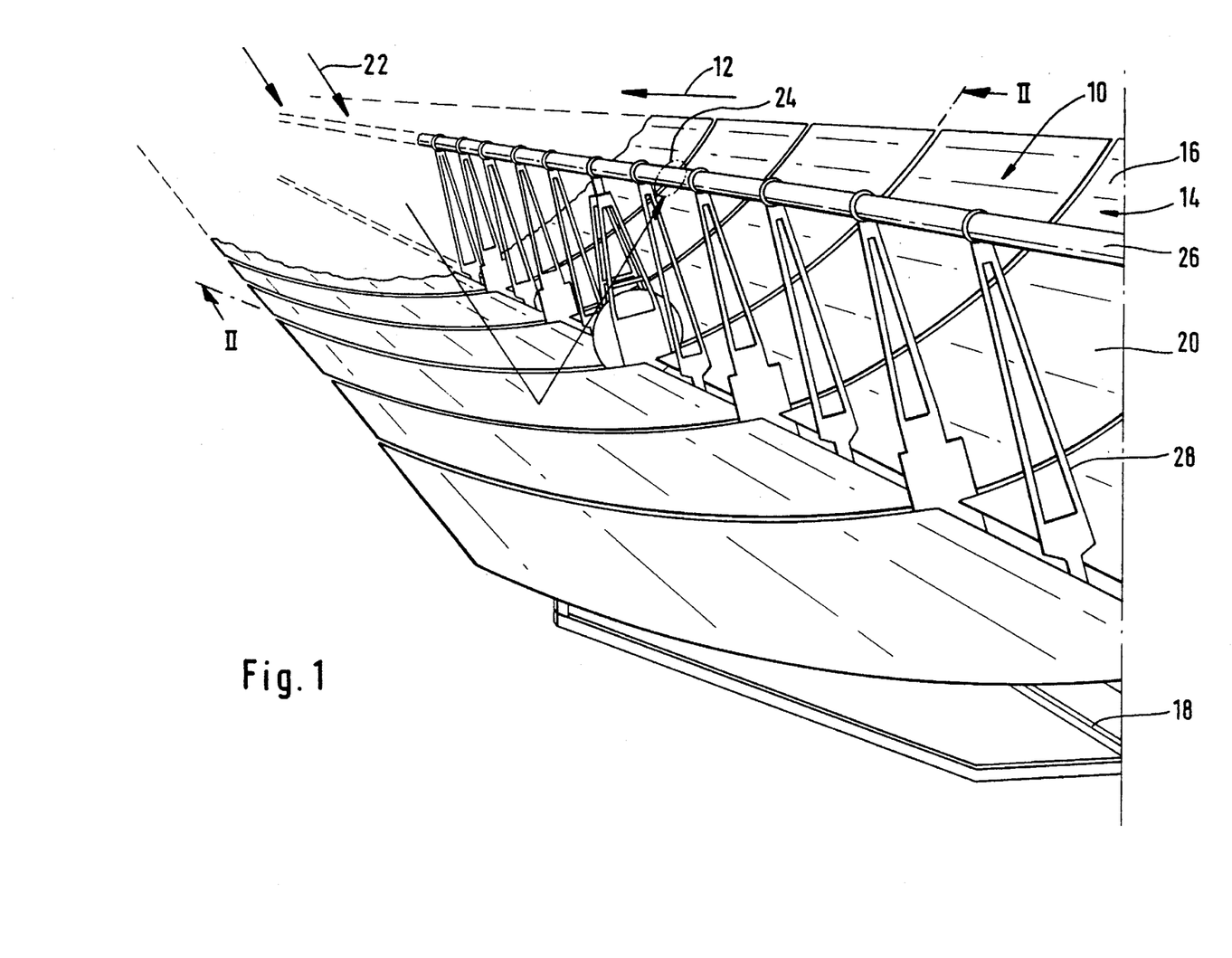
FIG. 1 is a schematic, perspective illustration of an inventive trough-shaped collector.
Figure 2:
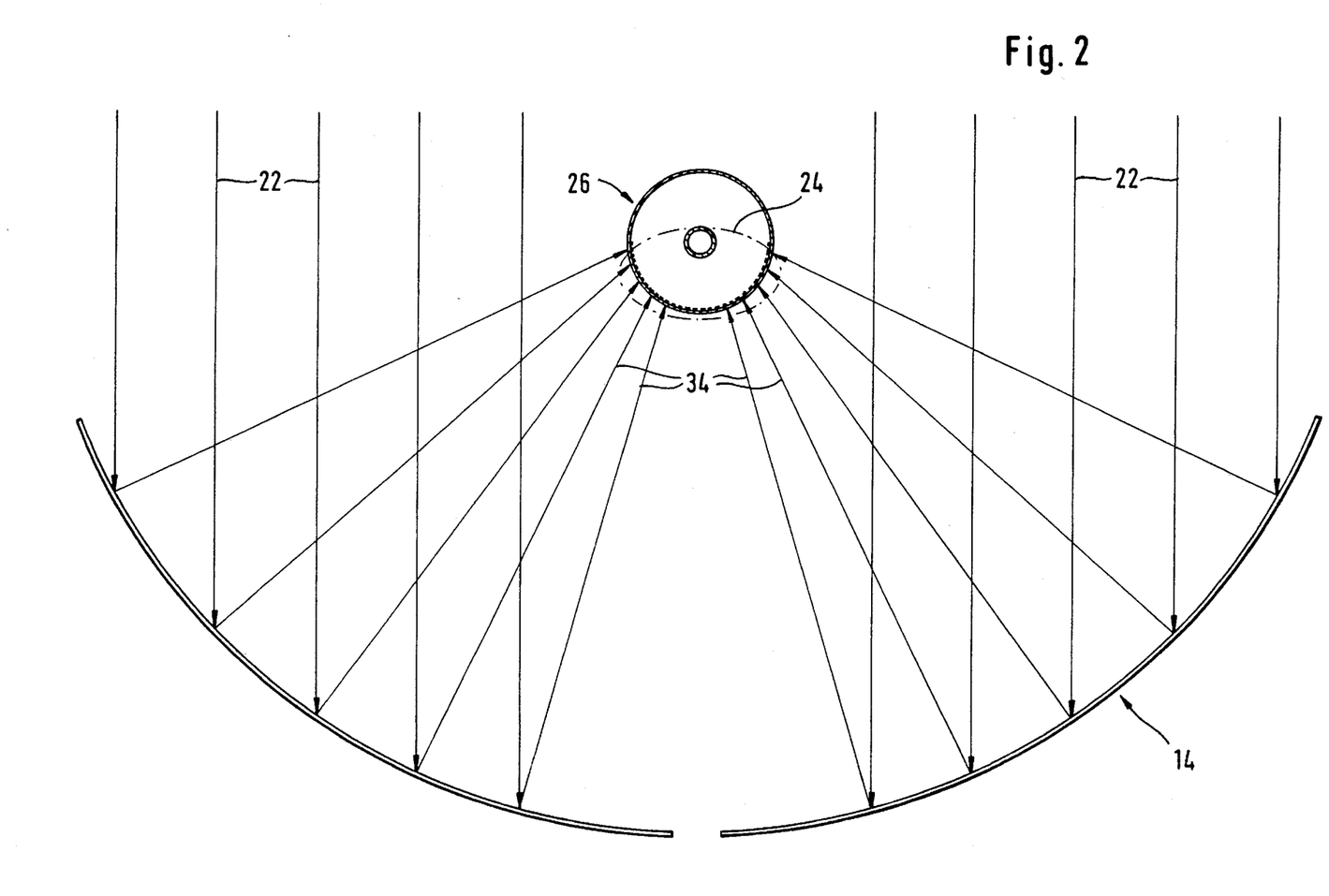
FIG. 2 is a section along line II—II in FIG. 1.

An embodiment of an inventive trough-shaped collector illustrated as a whole in FIG. 1 and designated as 10 extends in a longitudinal direction 12, for example over several hundred meters, and comprises a trough-shaped mirror 14 which is preferably designed as a parabolic mirror and constructed of a plurality of mirror elements 16 which are held on a mirror frame 18 and, together, form a mirror surface 20 which extends in the longitudinal direction 12 and is parabolic transversely to the longitudinal direction 12.

The parabolic mirror surface 20 reflects incoming solar radiation 22 into a focal line 24 which extends in the longitudinal direction 12 and in which an absorber line designated as a whole as 26 is located. This absorber line is likewise held on the mirror frame 18 via support struts 28. The support struts 28 are arranged one after the other at regular intervals in the longitudinal direction in order to hold the absorber line 26 precisely aligned in the focal line 24.

Figure 3:
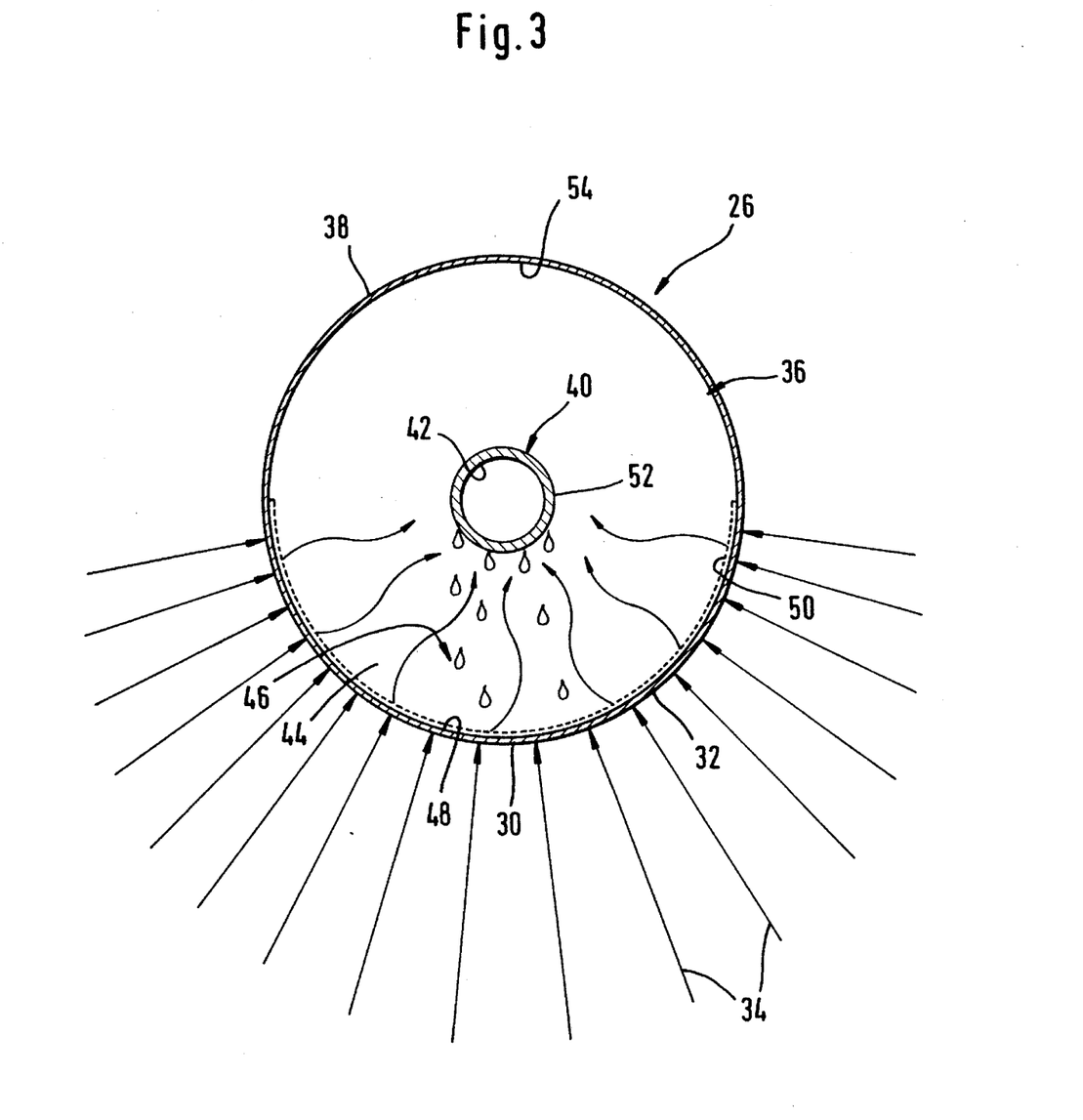
FIG. 3 is a cross section through a first embodiment of an inventive absorber line.

As illustrated in FIG. 3, the absorber line 26 comprises an absorber screen 30 which bears an absorber surface 32 impinged by solar radiation 34 reflected from the mirror surface 20.

The absorber screen 30 is preferably part of an absorber pipe designated as a whole as 36. This pipe forms with a cylinder segment the absorber screen 30 which is supplemented by a cylinder segment 38 facing away from the mirror to form the absorber pipe 36.

A guide tube 40 runs in the absorber pipe 36, preferably coaxially thereto. This guide tube guides a heat transport medium with a tube interior 42 to take away heat from the absorber line 26.

An annular chamber 44 located between the guide tube 40 and the absorber pipe 36 forms a steam chamber for a heat pipe designated as a whole as 46. This heat pipe provides a thermal coupling between the absorber pipe 36 and the guide tube 40 and in the simplest case, as illustrated in FIG. 3, comprises the absorber pipe 36 and the guide tube 40 as housing elements.

The heat pipe 46 also comprises a capillary structure 50 which is arranged on an inner wall 48 of the absorber screen 30 and is saturated with potassium as heat transport medium. The inner wall 48 of the absorber screen 30 and the capillary structure 50 form a vaporizer side of the heat pipe 46, on which the heat transport medium is vaporized. This then passes through the steam chamber 44 and condenses on a condensation surface 52 formed by the entire outer wall of the guide tube 40 and then drips in the condensed state from this condensation surface 52 onto the capillary structure 50 again, which soaks it up and distributes it evenly over this structure.

In addition, an inner wall 54 of the cylinder segment 38 facing away from the mirror likewise forms a condensation surface insofar as this is also kept at a temperature essentially the same as that of the capillary structure 50 by the heat transport medium in addition to the heat conductance in the absorber pipe 36 itself.

This means that, on the one hand, the absorber pipe 36 is evenly heated as a whole and, in addition, an efficient heat transport from the absorber screen 30 to the condensation surface 52 of the guide tube 40 takes place, whereby the entire circumferential surface of the guide tube 40 forms the condensation surface 52 and, therefore, also heats the guide tube 40 uniformly.

The heat transport medium conveyed in the guide tube 40 is preferably water so that the guide tube 40 is, in this case, designed as a vaporizer tube.

Figures 4, 5:
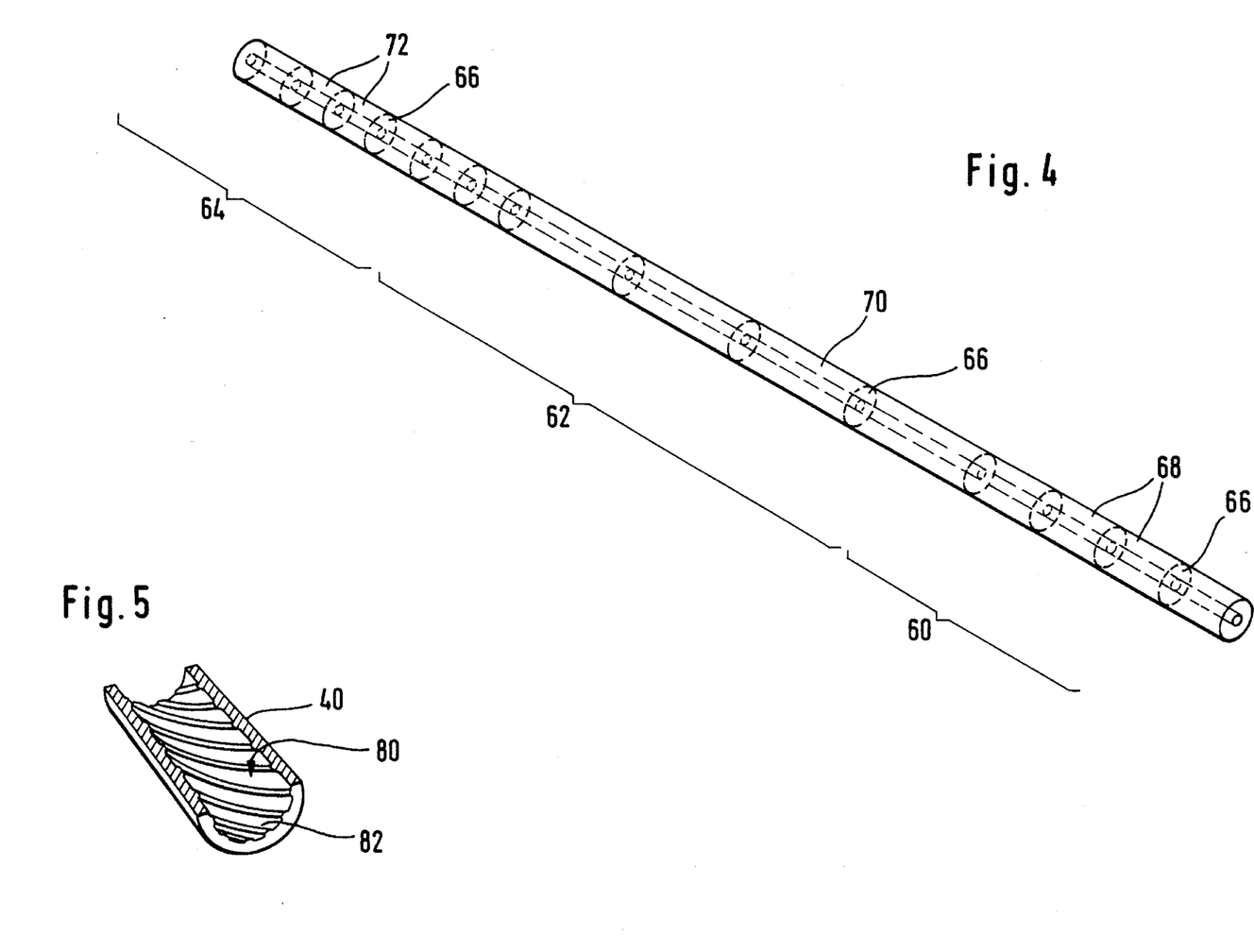
FIG. 4 is a perspective illustration of the first embodiment of the absorber line in different sections.
FIG. 5 is a longitudinal section through a variation of an inventive guide tube and FIG. 6 is a cross section similar to FIG. 3 through a second embodiment of an inventive absorber line.

A vaporizer tube 40 of this type extending through the absorber line 26 comprises a preheating section 60, in which water is heated up to boiling temperature, a phase transition section 62, in which the water is vaporized to an increasing extent, and a superheating section 64 following the phase transition section 62, in which the water which is entirely present as steam is superheated, i.e. heated to above the boiling point, by further increasing the temperature.

The heat pipe 46 formed between the absorber pipe 36 and the guide tube 40 is, as illustrated in FIG. 4, divided into consecutive heat pipe segments 68 by inserts 66 which are arranged at intervals from one another, extend radially to the guide tube between this and the absorber pipe 36 and are arranged one after the other in the longitudinal direction 12. This means that a possible thermal coupling in longitudinal direction between the inner wall 48 of the absorber screen 30 and the guide tube 40 by means of the heat pipe 46 is suppressed to a great extent in order to obtain an essentially uniform increase in the heating of the water in the region of the preheating section 60.

In the phase transition section 62, the temperature of the guide tube 40 is essentially constant so that, in this section, only a few heat pipe segments 70 formed by inserts 66 are provided for a continuous heat pipe 46.

On the other hand, an essentially linear superheating is likewise desired in the superheating section 64 so that in this region, as well, heat pipe segments 72 are formed by inserts 66 following one another at short intervals in order to prevent any thermal coupling over appreciable distances in the longitudinal direction 12.

In a variation of the inventive guide tubes 40, illustrated in FIG. 5, an inner wall 80 of the guide tube 40 is provided with helically extending grooves 82 which serve, in particular when using a vaporizer tube, to achieve an even better cooling of the tube wall while preventing any formation of a vapor film.

Figure 6:
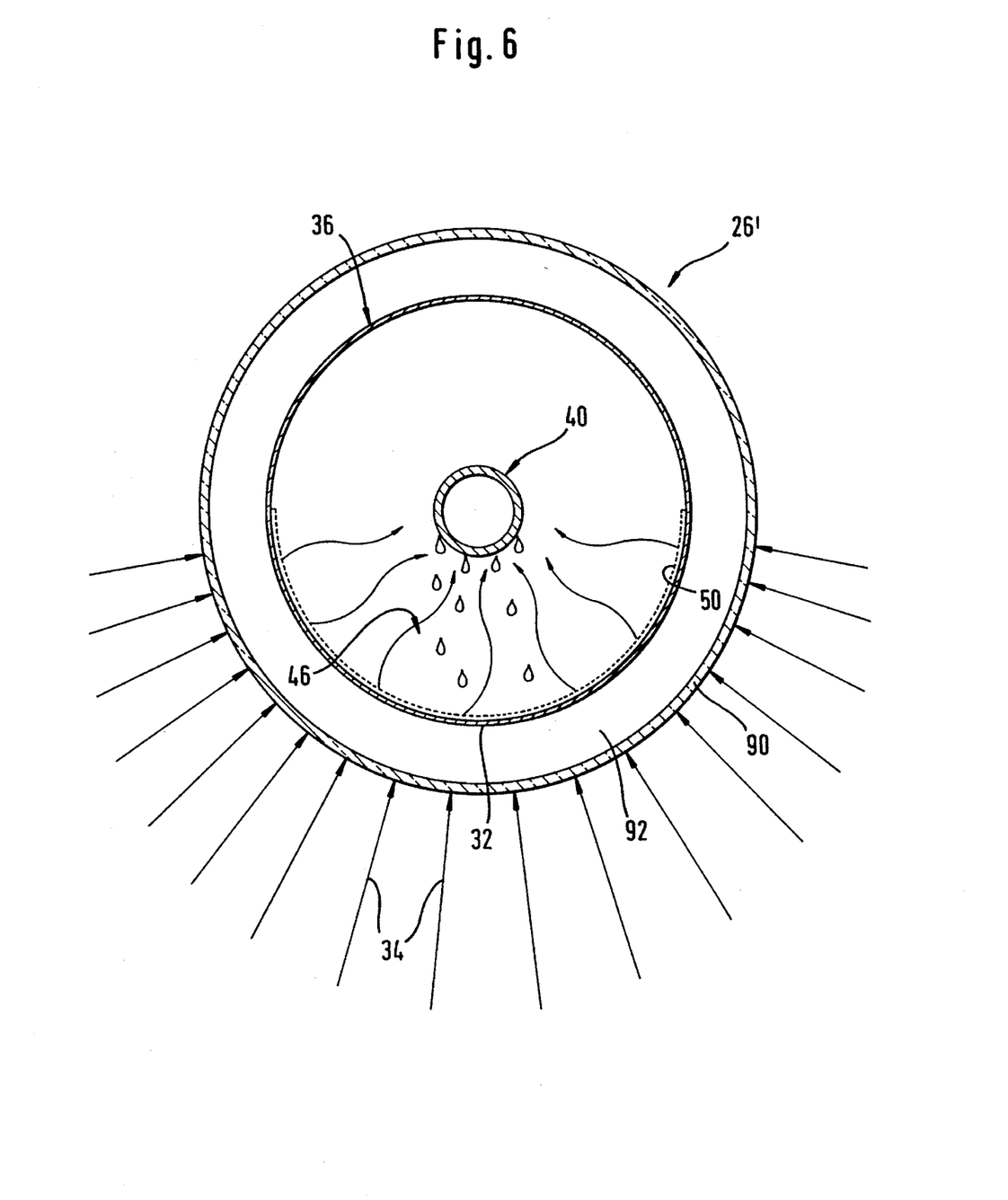

In a second embodiment of an inventive absorber line, designated as a whole as 26' in FIG. 6, the absorber pipe 36, the guide tube 40 and the heat pipe 46 are provided in the same way as in the first embodiment.

In addition, in order to suppress any convection cooling, the absorber pipe 36 is preferably arranged coaxially to a protective casing 90 surrounding it, this protective casing being made of glass, which is transparent for the reflected solar radiation 34, at least in the region engaging over the absorber surface 32. The entire protective casing 90 is preferably made of glass. In addition, an optimal insulation of the absorber pipe 36 is possible when an annular space 92 exists between the protective casing 90 and the absorber pipe 36, in which gas is present at a low pressure, preferably under vacuum.

As for the rest, the absorber line 26' is of identical design to the absorber line 26 so that the same reference numerals are also used for the same elements and in this respect reference is made in full to the comments concerning the first embodiment.

What is claimed is:

1. An elongated collector for collecting solar radiation for steam generation, said collector comprising:

(a) a tough-shaped mirror extending in a longitudinal direction for reflecting solar radiation into a focus region extending in the longitudinal direction;

(b) an absorber line comprising an absorber screen extending longitudinally and transversely in the focus region;

(c) a stream generator tube enclosed by said absorber line and lengthwise comprising a preheating section, a phrase transition section and a superheating section; and (d) heat pipe segments surrounding said steam generator tube to transfer heat in a transverse direction from said absorber line to said steam generator tube;

said superheating section, said phase transition section, and said preheating section of steam generator tube each encompassed by at least one of said heat pipe segments.

2. The collector as in claim 1 wherein said mirror, absorber line and steam generator tube are constructed and arranged for essentially uniform heating of said steam generator tube in a circumferential direction.

3. The collector as in claim 2 wherein said absorber line and steam generator tube form a steam chamber therebetween that essentially surrounds said steam generator tube.

4. The collector as in claim 1 wherein said absorber screen is part of an absorber pipe surrounding said steam generator tube.

5. The collector as in claim 1 wherein said absorber line and said steam generator tube are housing elements of said heat pipe segments.

6. The collector as in claim 1 wherein said heat pipe segments are formed by divider inserts radially extending from said absorber line to said steam generator tube, said inserts located at lengthwise intervals along said absorber line.

7. The collector as in claim 1 wherein said heat pipe segments include a capillary structure on an inner wall of at least a portion of said absorber screen.

8. The collector as in claim 1 wherein said absorber screen extends, in a direction transverse to said longitudinal direction, for a distance approximately equal to a focal line width of said focus region.

9. The collector as in claim 1 wherein said steam generator tube comprises a vaporizer tube.

10. The collector as in claim 1 wherein said steam generator tube has as inner wall with helical grooves to enhance heat transfer to a heat absorbing medium in the tube.

11. The collector as in claim 1 wherein said preheating section of said steam generator tube is encompassed by a plurality of heat pipe segments to reduce heat transfer in the longitudinal direction.

12. The collector as in claim 1 wherein said superheating section of said steam generator tube is encompassed by a plurality of heat pipe segments to reduce heat transfer in the longitudinal direction.

* * * * *

UNITED STATES PATENT AND TRADEMARK OFFICE
CERTIFICATE OF CORRECTION

PATENT NO. : 5,460,163
DATED : Oct. 24, 1995
INVENTOR(S) : Goebel

It is certified that error appears in the above-identified patent and that said Letters Patent is hereby corrected as shown below:

Column 6, line 33     change "stream generator" to -- steam generator -- .

Signed and Sealed this

Twenty-third Day of January, 1996

Attest:

BRUCE LEHMAN

Attesting Officer     Commissioner of Patents and Trademarks